US006981272B1

(12) United States Patent
Morinaga et al.

(10) Patent No.: US 6,981,272 B1
(45) Date of Patent: Dec. 27, 2005

(54) DATA PROCESSING APPARATUS AND METHOD FOR PREVENTING UNAUTHORIZED COPYING

(75) Inventors: Takeo Morinaga, Kanagawa (JP); Ichiro Hamada, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/646,589

(22) PCT Filed: Jan. 21, 2000

(86) PCT No.: PCT/JP00/00290

§ 371 (c)(1), (2), (4) Date: Sep. 19, 2000

(87) PCT Pub. No.: WO00/44170

PCT Pub. Date: Jul. 27, 2000

(30) Foreign Application Priority Data

Jan. 21, 1999 (JP) ............................... P11-013417

(51) Int. Cl.[7] ................................................ H04N 7/16

(52) U.S. Cl. .......................... 725/25; 725/31; 725/132; 725/140; 725/152; 386/94; 360/60; 380/201; 380/203

(58) Field of Search ................................ 380/201, 203; 386/94; 725/25, 30, 31, 100, 104, 133, 141, 725/153; 360/60

(56) References Cited

U.S. PATENT DOCUMENTS

| | | | | |
|---|---|---|---|---|
| 5,574,787 A * | 11/1996 | Ryan | ........................... | 380/201 |
| 5,719,937 A | 2/1998 | Warren et al. | | |
| 5,778,140 A * | 7/1998 | Okamoto et al. | ............. | 386/94 |
| 6,122,377 A | 9/2000 | Bromba et al. | | |
| 6,256,390 B1 * | 7/2001 | Okuyama et al. | ........... | 380/201 |
| 6,370,318 B1 * | 4/2002 | Iwaki | .......................... | 386/94 |

FOREIGN PATENT DOCUMENTS

| | | |
|---|---|---|
| DE | 195 25 425 C1 | 10/1996 |
| EP | 0 794 487 A2 | 9/1997 |
| JP | 9-322103 | 12/1997 |
| WO | 97/25816 | 7/1997 |
| WO | WO 99 18723 A | 4/1999 |

* cited by examiner

*Primary Examiner*—Ngoc Vu
(74) *Attorney, Agent, or Firm*—Lerner, David, Littenberg, Krumholz & Mentlik, LLP

(57) ABSTRACT

The present invention relates to a data processing system and method that control the outputs of a receiving apparatus depending upon a copy restriction code. The receiving apparatus determines whether the copy restriction code allows for one or no copies to be made and controls the outputs of the receiving apparatus accordingly.

11 Claims, 2 Drawing Sheets

DATA PROCESSING APPARATUS AND METHOD FOR PREVENTING UNAUTHORIZED COPYING

FIELD OF THE INVENTION

The present invention relates to a data processing system and method applied to such as an IRD (integrated receiver decoder) for the DVB (digital video broadcast).

BACKGROUND OF THE INVENTION

In a typical of digital broadcasting system, after the video data and audio data of plural channels are compression-coded using for example the MPEG2 (moving picture experts group phase 2) standard. The data is packetized per the predetermined unit (such as a 184 bit) (hereinafter, the resultant packets are referred to as TS (transport stream) packets) and multiplexed, to form a transport stream which is then transmitted via terrestrial wave, satellite wave or cable as the digital broadcasting signal.

In such digital broadcasting system, a receiving apparatus extracts TS packets corresponding to a desired channel from among the TS packets contained in the transport stream received as a digital broadcasting signal, and decodes them back to the video data and audio data in the original signal format according to the reverse procedure to the compression processing.

In recent years, such a receiving apparatus has a plurality of digital signal output terminals for external connections (hereinafter referred to as digital output terminal). This allows audio data obtained by the aforementioned decoding, after being converted into a predetermined format, to be output to an external apparatus via an IEC (International Electro-Technical Committee) 958 format optical digital audio output terminal or to be output to an external apparatus via a high-speed serial interface such as an IEEE (Institute of Electrical and Electronics Engineers) 1394, or allows the transport stream before decoding itself to be output to an external apparatus.

Since degradation in image quality and sound quality does not occur in digitized video data and audio data, a digital recording apparatus can duplicate digital data an unlimited number of times without degradation in quality.

Therefore, in general, by transmitting video data and audio data after adding predetermined copy control data (CCI: copy control information) at the transmitting end, copying is restricted based on the copy control data at the digital receiving end, and thus, unlawful copying can be prevented.

According to the SCMS (serial copy management system) adopted in the IEC 958 standard, this copy control data has three types of information: "never copy", "copy once", and "copy free". More specifically, "never copy" indicates that copying is not allowed, "copy once" indicates that only one copy is allowed (after one copy the copy control data shifts to "never copy"), and "free copy" indicates that copying is allowed an unlimited number of times. In the aforementioned digital broadcasting system, such copy control data is added to each program.

However, in a digital broadcasting signal with copy control data, set to "copy once" is received by the aforementioned receiving apparatus and the receiver is connected to a plurality of digital recorders, the digital signal is output from each of the plurality of digital output terminals at the same time. Therefore, even if only one copy is allowed more than one copy may be made by connecting each digital output terminal to a digital recording apparatus.

In addition, in practice, it has been quite difficult for the receiving apparatus equipped with plural digital output terminals to use new application that limits the number of copies such as pay-per-download.

SUMMARY OF THE INVENTION

The present invention provides a data processing apparatus and data processing method that prohibits unauthorized copying.

The present invention, provides a plurality of output terminals for transmitting digital data to which the predetermined control data to be supplied is attached, and a control means for controlling the output of each output terminal so as to output digital data via only one specified output terminal out of the plural output terminals according to the contents of copy restriction based on the control data.

As a result, when the copy restriction exists in the control data, the digital data can be prevented from being output via the plural output terminals.

Furthermore, according to the present invention, in the case of outputting digital data to which the predetermined control data to be supplied is attached via a plurality of output formats, each output format is controlled according to the contents of copy restriction in the control data, so as to output the digital data via only one output format out of the plurality of output formats.

As a result, according to this data processing method, when the copy restriction exists in the control data, digital data can be prevented from being output via the plural output systems.

DETAILED DESCRIPTION OF THE PREFERRED EMBODIMENT

With reference to the accompanying figures one embodiment of the present invention will be described. The following description is made using an EMD (electric music distribution) system as the digital broadcasting system. The invention is applicable not only to the EMD but also to movie distribution service.

Figure 1:
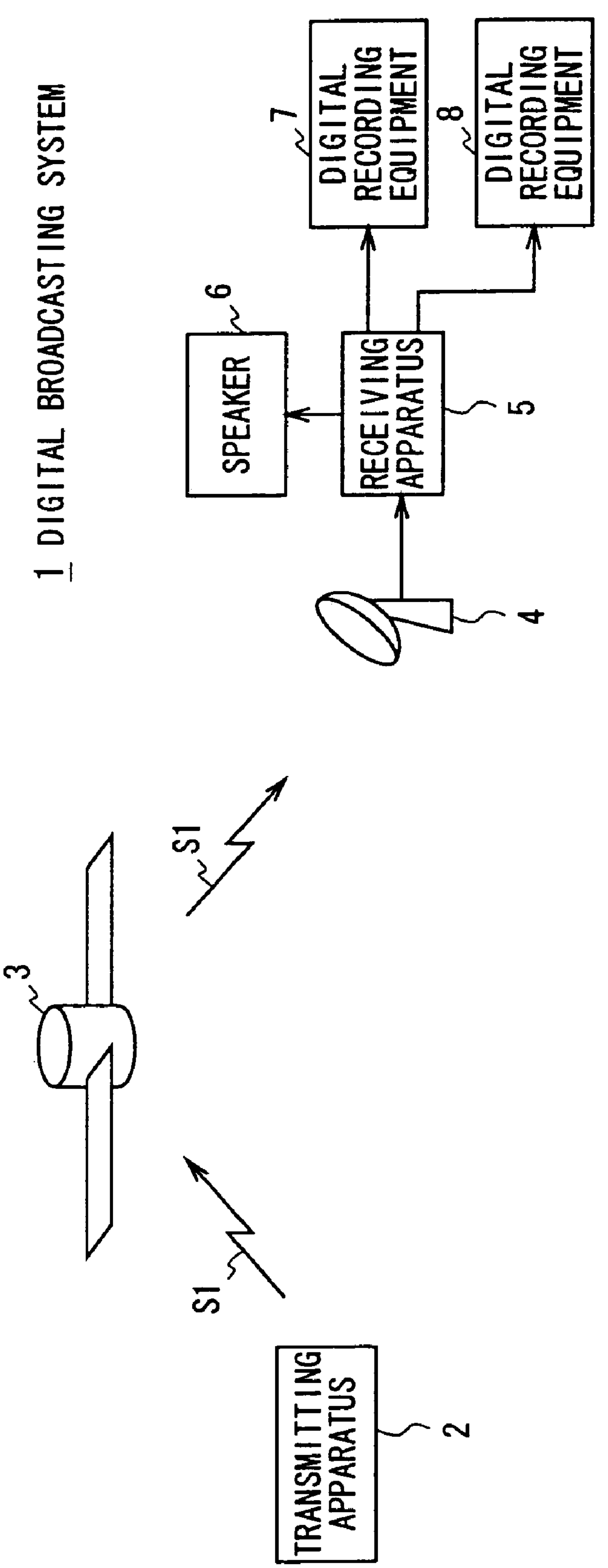
FIG. 1 is a schematic diagram showing the construction of a digital broadcasting system according to the embodiment of the present invention.

In FIG. 1, numeral 1 generally shows a digital broadcasting system 1 according to the present invention. At the transmitting apparatus 2, music data for a plurality of channels are compression-encoded using the MPEG2 system and are TS-packetized per the predetermined unit and multiplexed, so as to form a transport stream. In addition, in this digital broadcasting system, not only the music distribution service but also video and audio data of programs such as a film and a drama can be compression-coded using the MPEG system and transport streams are formed. Thus formed plural transport streams are frequency-multiplexed and transmitted.

At this point, the transmitting apparatus 2 inserts a TS packet copy control data in a predetermined format into the transport stream for the music distribution service. The copy control data has three levels of classification. The first level prohibits any copying, the second level allows only one copy to be made, and the third level allows an unlimited number of copies.

Programs which are transmitted using digital satellite broadcasting include copyright information to prevent copyright infringement. In a PMT (program map table) of a transport stream, the copyright information which relates to the service is inserted by being added to the contents, as two descriptors DM_copy_control_descriptor and digital_copy_control_descriptor.

The descriptor called DM_copy_control_descriptor includes information on analog video output, such as trigger information for analog copy guard. In addition, pay-per-tape (service to charge every time when recording on a recording medium such as a magnetic tape) information is also included. When a user records contents which is the pay-per-tape, he should ask and pay additional fee to release the analog copy guard. If he does not ask, the analog copy guard is not released.

The descriptor called digital_copy_control_descrptor includes CGMS (copy generation management system) information which is the same as the aforementioned SCMS and the digital output is controlled according to this information.

The CGMS copyright information is represented by two bits. The two bits indicate as follows:

"00" shows that copying is allowed freely.

"01" shows that copying is not allowed in CGMS.

"10" shows that copying is allowed only once.

"11" shows that copying is never allowed.

In the present invention, outputs from the plural digital output terminals are controlled according to the contents of the descriptor called the digital_copy_control_descriptor.

The transmitting apparatus 2 transmits a digital broadcasting signal S1 comprising a frequency-multiplexed transport stream via a communication satellite (CS) 3. The digital broadcasting signal is then transmitted to a receiving apparatus 5 via an antenna 4.

The receiving apparatus 5 selects a desired frequency from the received digital broadcasting signal, extracts the TS packets having the audio data of a desired tune from the transport streams transmitted at the selected channel, and decodes the audio data stored in these TS packets for transmission to a speaker 6 and also for output to digital recording apparatuses 7, 8 such as a MD (mini disc) recorder via a digital output terminal (not shown) as required.

Figure 2:
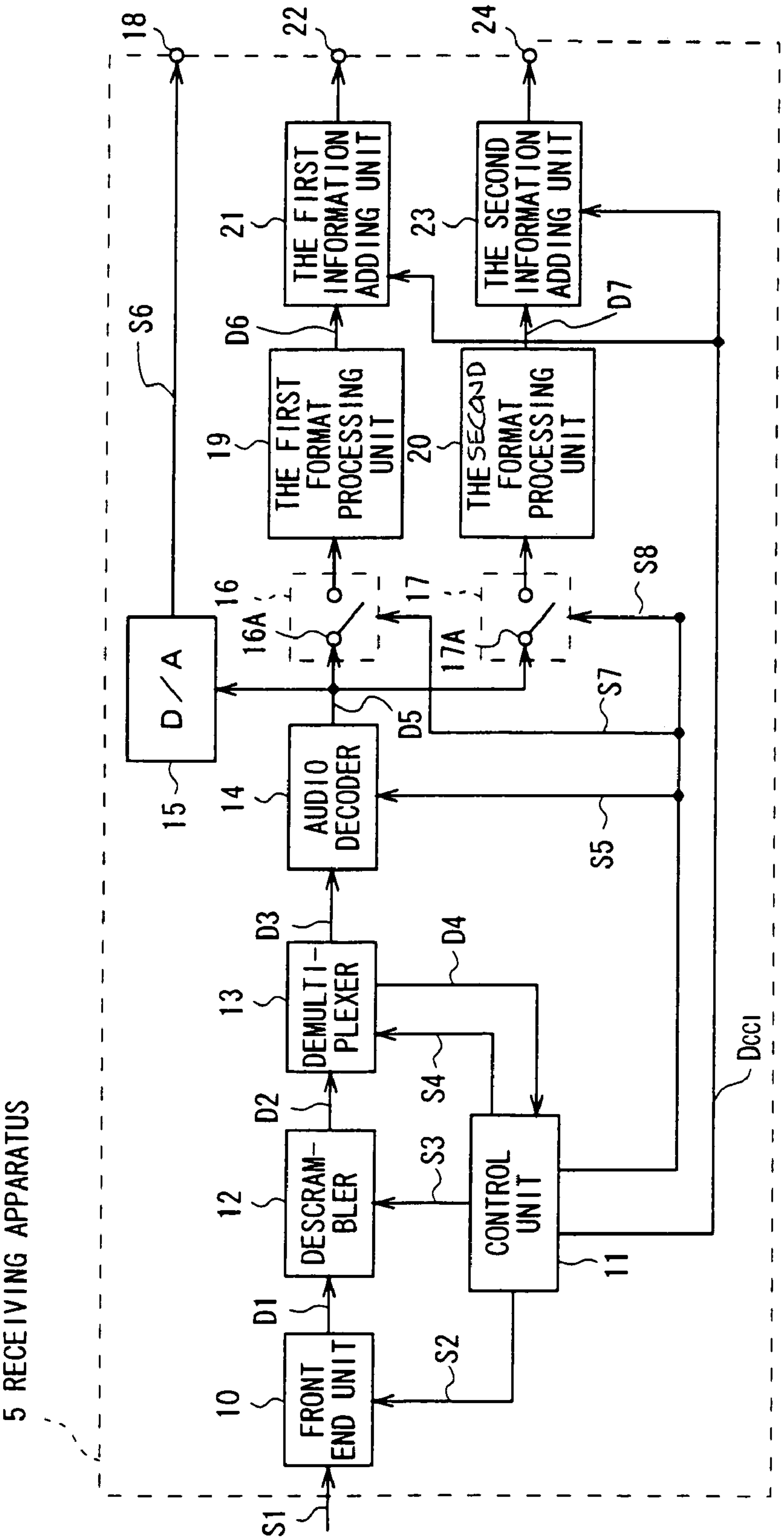
FIG. 2 is a block diagram showing the construction of a receiving apparatus according to the embodiment of the present invention.

In practice, the receiving apparatus 5 is constructed as shown in FIG. 2. A front-end unit 10, receiving the digital broadcasting signal S1 via the antenna 4, tunes to a frequency (frequency assigned to a transponder loaded on the communication satellite 3) based on a channel specification command S2 transmitted from a control unit 11. Then, it performs, for example, QPSK (quadrature phase shift keying) demodulation and error correction processing and outputs a transport stream D1 having the coded data of the desired program.

A descrambler 12 sequentially descrambles the encrypted TS packets using a decryption signal S3 which is obtained from the control unit 11, and transmits the descrambled transport stream D2 to a demultiplexer 13.

The demultiplexer 13, receiving a control signal S4 corresponding to a program specified by the user from the control unit 11, extracts TS packets D3 having the audio data of the specified program and a TS packet D4 having the copy control data, and transmits the TS packets D3 to an audio decoder 14 and transmits the TS packet D4 to the control unit 11. Note that, in the case where the selected program is a film, drama, or news, TS packets having video data are also extracted and supplied to a video decoder not shown.

After decoding the audio data included in the extracted TS packets, the audio decoder 14, transmits the audio data to a D/A (digital/analog) converter 15, an input terminal 16A of a switch 16 and an input terminal 17A of a switch 17, according to a control signal S5 which is sent from the control unit 15.

The D/A converter 15, after converting the resultant audio data D5 to analog data, transmits this to the externally connected speaker 6 (FIG. 1) via an analog output terminal 18 as an analog audio signal S6. As a result, the speaker reproduces sound based on this analog audio signal S6.

The control unit 11 extracts copy control data $D_{CC1}$ included in the supplied TS packet D4 and determines if the copy control data $D_{CC1}$ belongs to the first level that prohibits copying, the second level that allows only one copy to be made, or the third level that allows an unlimited number of copies to be made, and transmits switch signals S7 and S8 to the switches 16 and 17 respectively according to the determination.

When the control unit 11 determines that the decoded copy control data $D_{CC1}$ is the third level, the control unit 11 connects switches 16 and 17 to ON conditions. When the control unit 11 determines that the copy control data $D_{CC1}$ is the first or the second level, it connects either the switch 16 or 17 specified by the user to ON condition.

At the time when the switch 16 is ON condition and the switch 17 is OFF condition, the audio data D5 supplied from the audio decoder 14 is supplied to a first format processing unit 19. The first format processing unit 19, after converting the audio data D5 to the predetermined format according to the IEC958 for example, transmits this to a first information adding unit 21 as first audio data D6.

The first information adding unit 21, after adding the copy control data $D_{CC1}$ to the first audio data D6, transmits this to the externally connected digital recording equipment 7 (FIG. 1) via a digital output terminal 22.

For the case when switch 16 is in the OFF condition while the switch 17 is in the ON condition, the audio data D5 supplied from the audio decoder 14 is given to the second format processing unit 20. This second format processing unit 20, after converting the audio data D5 to the predetermined format according to such as the IEEE1394, transmits this to a second information adding unit 23 as the second audio data D7.

The second information adding unit 23 adds the copy control data $D_{CC1}$ to the second audio data D7 and applies encryption processing to the second audio data D7 only when the copy control data $D_{CC1}$ shows the first or the second level. The data is passed to the external digital recording apparatus 8 (FIG. 1) via the digital output terminal 24. This encryption processing is based on the standard called 5CDTCP and is to protect copyright at the time of transmitting digital content data such as audio and video in the IEEE1394.

In this way, the first or the second audio data D6 or D7 to which the copy control data $D_{CC1}$ is attached is supplied to either digital recording apparatus 7 or 8 which is specified by the user. Thus, in the digital recording apparatus 7 or 8, the first or the second audio data D6 or D7 can be recorded on the predetermined recording medium (not shown) under the condition in which copy restriction is imposed in the form of the level of the copy control data $D_{CC1}$.

According to the present invention described above, when the audio data D5 of a program specified by the user is not allowed to be copied or is allowed to be copied only once according to the copy control data $D_{CC1}$, the first or the second audio data D6 or D7 is transmitted to either the digital output terminal 22 or 24 which is specified by the user out of two digital output terminals 22 and 24.

Accordingly, the receiving apparatus 5 can supply the first or the second audio data D6 or D7 to which the copy control data $D_{CC1}$ is added, to either digital recording apparatus 7 or 8 which is specified by the user. As a result, in the digital recording apparatus 7 or 8, copy restriction based on the copy control data $D_{CC1}$ can be imposed.

According to the foregoing construction, in this receiving apparatus 5, only when the copy restriction based on the copy control data $D_{CC1}$ exists, the audio data D5 (D6, D7) is output together with the copy control data $D_{CC1}$ to either digital output terminal 22 or 24 which is specified by the user. Therefore, copy restriction can be imposed at the digital recording apparatus 7 or 8 connected to the digital output terminal 22 or 24. And thereby the execution of unlimited dubbing can be avoided in advance.

The embodiment described above has dealt with the case of converting the audio data D5 (D6, D7) to which the predetermined copy control data $D_{CC1}$ to be supplied is added, into plural formats (formats corresponding to interface of the IEC958 and IEEE1394) and outputting them. However, the present invention is not only limited to this but also these may be converted into the format corresponding to the interface which is used in various other digital data.

Further, the embodiment described above has dealt with the case of applying the audio data D5 as the digital data to be supplied. However, the present invention can be applied to other types of digital data such as digitalized video data.

Furthermore, the embodiment described above has dealt with the case of applying the digital output terminal 22 based on the IEC958 and the digital output terminal 24 based on the IEEE1394 as the plural output terminals for outputting the supplied audio data D5. However, the present invention may have a plurality of digital output terminals based on the IEC958 standard and based on the IEEE1394 standard.

Furthermore, the embodiment described above has dealt with the case of applying the control unit 11 as the control means for controlling the output of each output terminal according to the contents of copy restriction based on the copy control data $D_{CC1}$. However, the present invention is not only limited to this but also, in short, provided that the audio data D5 (D6, D7) can be output via only one digital output terminal 22 or 24 which is specified out of the plural digital output terminals 22 and 24 when it is determined that the copy restriction is imposed, control means having various other constructions can be used as the control means.

In this case, as a method to specify a digital output terminal alternatively, the first format processing unit or the second format processing unit can be stopped, in addition to the case where the switches 16 and 17 are switched so that one of them is switched ON.

Furthermore, in the aforementioned embodiment, the copy restriction based on the copy control data $D_{CC1}$ is classified into three: the first level that prohibits copy; the second level that allows copy once; and the three level that allows copy freely. However, the present invention is not limited thereto and a level that allows copy plural number of times (twice or more) can be provided between the second level and the third level.

Furthermore, the embodiment described above has dealt with the case of applying the data processing apparatus according to the present invention to the digital CS broadcasting using the communication satellite 3. However, the present invention is not only limited to this but also it can be widely applied to various broadcasting systems such as the digital terrestrial wave broadcasting and CATV (cable television) broadcasting.

Furthermore, the embodiment described above has dealt with the case of applying the MD recorders as the digital recording apparatus 7, 8 connected to the digital output terminals 22, 24 provided in the receiving apparatus 5. However, the present invention is not only limited to this but also it can be widely applied to the recording apparatus capable of recording various digital data such as a rewritable optical disc apparatus and digital VTR.

According to the present invention as described above, since the control means for controlling the output of each output terminal in order to output digital data only via one specified output terminal out of plural output terminals according to the contents of the copy restriction based on the control data is provided, the digital data can be prevented from being output via plural output terminals when the control data shows the copy restriction. And thus, a data processing apparatus capable of conducting the data control certainly can be realized.

Furthermore, according to the present invention, in the data processing method, by controlling each output system in order to output the digital data via only one specified output system out of plural output systems according to the contents of the copy restriction based on the control data, the digital data is prevented from being output via plural output systems when the control data shows any copy restriction. And thereby, the data processing method capable of conducting the data control certainly can be realized.

What is claimed is:

1. A data processing apparatus, comprising:

a plurality of output terminals for outputting digital data, said digital data including predetermined copy control data;

a first format processing unit coupled to a first output terminal from among said plurality of output terminals for providing said digital signal in a first data format;

a second format processing unit coupled to a second output terminal from among said plurality of output terminals for providing said digital signal in a second data format;

one or more switches coupled to said first and second format processing units; and a control means for controlling said one or more switches and each of said plurality of output terminals such that said digital data is selectively output from said first or second output terminal in said first or second data format according to said predetermined copy control data.

2. The data processing apparatus according to claim 1, wherein said control means adds said predetermined copy control data to said digital data to be output from said first or second output terminal.

3. The data processing apparatus according to claim 1, wherein said predetermined copy control data indicates whether said digital data can be copied.

4. The data processing apparatus according to claim 1, wherein the first data format conforms to the IEEE 1394 standard.

5. The data processing apparatus according to claim 1, wherein the second data format conforms to the IEC 958 standard.

6. The data processing apparatus according to claim 1, wherein the second data format comprises an optical output.

7. A data processing method, comprising:

conveying digital data to a plurality of outputs on an apparatus;

converting said digital data to a first or second data format based on a predetermined copy control data;

controlling each of said plurality of outputs such that said converted digital data is selectively output from only a specified one of said plurality of outputs in either said first or second data format according to said predetermined copy control data; and adding said predetermined copy control data to said digital data to be output from said specified one of said plurality of outputs.

8. The data processing method according to claim 7, wherein said predetermined copy control data indicates whether said digital data can be copied.

9. The data processing method according to claim 7, wherein converting said digital data to a first data format comprises converting said digital data into an optical signal.

10. The data processing method according to claim 7, wherein converting said digital data to a first data format comprises converting said digital data into the IEC 958 data format.

11. The data processing method according to claim 7, wherein converting said digital data to a second data format comprises converting said digital data into the IEEE 1394 data format.

* * * * *

UNITED STATES PATENT AND TRADEMARK OFFICE

CERTIFICATE OF CORRECTION

PATENT NO. : 6,981,272 B1 
DATED : December 27, 2005
INVENTOR(S) : Takeo Morinaga and Ichiro Hamada It is certified that error appears in the above-identified patent and that said Letters Patent is hereby corrected as shown below:

Column 1,
Line 13, after “typical” delete “of”.
Line 15, after “using” insert -- , --; and after “example” insert -- , --.
Line 16, after “standard” insert -- , -- and delete “.”; and after “standard,” insert lower case -- t --.
Line 62, delete “in” and insert -- if --.
Line 63, after “data”, delete “,”.

Column 3,
Line 10, after “descriptors” insert -- , --.

Signed and Sealed this

Ninth Day of May, 2006

JON W. DUDAS
*Director of the United States Patent and Trademark Office*